United States Patent
Kusano et al.

(10) Patent No.: US 7,736,064 B2
(45) Date of Patent: Jun. 15, 2010

(54) ROLLING BEARING AND MOTOR DEVICE USING THE SAME

(75) Inventors: Hirotsugu Kusano, Kashihara (JP); Masayoshi Yamamoto, Chiyoda-ku (JP)

(73) Assignees: JTEKT Corporation, Osaka-shi (JP); Mitsubishi Denki Kabushiki Kaisha, Tokyo (JP)

( * ) Notice: Subject to any disclaimer, the term of this patent is extended or adjusted under 35 U.S.C. 154(b) by 878 days.

(21) Appl. No.: 10/584,260

(22) PCT Filed: Dec. 22, 2004

(86) PCT No.: PCT/JP2004/019719

§ 371 (c)(1),
(2), (4) Date: Jun. 26, 2006

(87) PCT Pub. No.: WO2005/061915

PCT Pub. Date: Jul. 7, 2005

(65) Prior Publication Data
US 2007/0147717 A1    Jun. 28, 2007

(30) Foreign Application Priority Data
Dec. 24, 2003    (JP) .............................. 2003-426664

(51) Int. Cl.
*F16C 43/00*    (2006.01)
(52) U.S. Cl. ....................... 384/537; 384/903
(58) Field of Classification Search ................ 384/152, 384/295, 535, 536, 537, 581, 582, 903, 96, 384/539, 561; 277/572, 573, 587, 630, 637, 277/641, 642, 643; 285/239, 242, 252, 253, 285/336, 347, 351
See application file for complete search history.

(56) References Cited

U.S. PATENT DOCUMENTS

| | | | |
|---|---|---|---|
| 3,702,720 A | | 11/1972 | Hallerback |
| 4,696,587 A | | 9/1987 | Nishida et al. |
| 5,247,855 A | * | 9/1993 | Alten et al. ............... 74/606 R |
| 5,325,940 A | * | 7/1994 | Rueckert et al. ........... 188/71.8 |
| 5,642,946 A | | 7/1997 | Caillault et al. |
| 5,826,681 A | * | 10/1998 | Kubo et al. ................ 188/71.8 |
| 6,280,095 B1 | * | 8/2001 | Furukoshi et al. ........... 384/489 |
| 2002/0012485 A1 | | 1/2002 | Zauner et al. |

FOREIGN PATENT DOCUMENTS

| | | |
|---|---|---|
| DE | 203 04 998 U 1 | 9/2003 |
| JP | 163226 1984 | 11/1984 |
| JP | 102020 1990 | 8/1990 |
| JP | 6223 1993 | 1/1993 |
| JP | 6522 1995 | 1/1995 |
| JP | 10 184699 | 7/1998 |
| JP | 2002 130309 | 5/2002 |

* cited by examiner

Primary Examiner—Thomas R Hannon
Assistant Examiner—James Pilkington
(74) Attorney, Agent, or Firm—Oblon, Spivak, McClelland, Maier & Neustadt, L.L.P.

(57) ABSTRACT

A roller bearing is provided with an elastic member that is fitted to an annular groove that is formed in the outer circumference of an outer ring. A chamfered portion, formed on one side face of the groove, is made larger than a chamfered portion formed on the other side face, and has a distance from the bottom face of the groove that is set to ½ or more of the thickness of the elastic member.

3 Claims, 2 Drawing Sheets

ROLLING BEARING AND MOTOR DEVICE USING THE SAME

TECHNICAL FIELD

The present invention relates to a roller bearing, and more particularly concerns a roller bearing with an elastic member being interposed between the roller bearing and a housing to which it is fitted, and a motor device using such a roller bearing.

BACKGROUND ART

In a roller bearing which is provided with an outer ring, an inner ring and a plurality of rollers interposed between the two rings, a structure has been proposed in which an O-ring is fitted to an annular groove formed in the outer circumference of the outer ring so that an creep property of the outer ring, which is exerted when vibration and an unbalanced load are applied thereto, is improved (Patent Document 1=Japanese Patent Application Laid-Open No. 2002-13030.9). The roller bearing of this type is used for supporting, for example, a rotation axis of a motor device so as to provide effects for reducing vibrations and operation sound of the motor.

In the roller bearing of Patent Document 1, however, upon attaching the outer ring to the housing, the O-ring (elastic member) tends to be sandwiched between the opening edge of the groove and the housing, resulting in damages to the O-ring.

The objective of the present invention is to provide a roller bearing that can reduce vibrations and operation sound and also prevent damages to an elastic member that is used for reducing these, and a motor device using such a roller bearing.

DISCLOSURE OF THE INVENTION

In accordance with the present invention, a roller bearing, which is provided with an outer ring, an inner ring, a plurality of rollers placed between the two rings and an annular elastic member that is fitted to an annular groove formed in either one of the outer circumference of the outer ring and the inner circumference of the inner ring, is characterized in that a chamfered portion formed on one side face of the groove and a chamfered portion formed on the other side face are made asymmetric with each other.

The greater chamfered portion of the two chamfered portions that are asymmetric with each other is preferably designed to have a distance from the bottom face of the groove that is set to ½ or more of the thickness of the elastic member.

In accordance with the present invention, a motor device, which is provided with a motor, a housing that accommodates the motor and a roller bearing that has an outer ring, an inner ring and a plurality of rollers interposed between the two rings, and supports the rotation axis of the motor, with an elastic member being fitted to an annular groove formed in the outer circumference of the outer ring of the roller bearing, is characterized in that a chamfered portion formed on one side face of the groove to which the elastic member is fitted and a chamfered portion formed on the other side face are made asymmetric with each other.

The greater chamfered portion of the two chamfered portions that are asymmetric with each other is preferably designed to have a distance from the bottom face of the groove that is set to ½ or more of the thickness of the elastic member, and it is preferable to have an arrangement in which upon fitting the outer ring to the housing, the greater chamfered portion is fitted thereto later.

The number of sets of the groove and the elastic member may be one set or two sets, and in the case of two, both of the sets of the groove and the elastic member are made to satisfy the above-mentioned conditions.

The elastic member is prepared as, for example, an O-ring; however, not limited to this mode, another cross-sectional shape, such as a round shape, an elliptical shape, a rectangular shape or the like, may be used.

When the elastic member is prepared as the O-ring, the thickness thereof corresponds to its wire diameter of the O-ring, and the following expression is preferably satisfied: the inner diameter of the chamfered portion $\geq$ the center diameter of the O-ring. In the case when the elastic member has a cross-sectional shape other than the round shape, the thickness of the elastic member is allowed to satisfy the following expression the thickness=(the outer diameter of the elastic member−the inner diameter of the elastic member)/2, and the condition that the distance from the bottom face of the groove to the chamfered portion is set to ½ or more of the thickness of the elastic member corresponds to the following expression: the inner diameter of the chamfered portion $\geq$ (the outer diameter of the elastic member+the inner diameter of the elastic member)=the center diameter of the elastic member.

The state that one of the chamfered portion is greater than the other chamfered portion refers to the condition that, supposing that the center value of one of the chamfered portions is A, with a production error being set to a, and that the center value of the other chamfered portion is B, with a production error being set to b, $(B-b)>(A+a)$ is satisfied.

Upon fitting the roller bearing to the housing, the smaller chamfered portion is placed on the side closer to the housing. The elastic member receives a force from the housing in a direction reversed to a fitting direction; however, since the amount of the corresponding chamfer is greater, the elastic member is allowed to deform to a comparatively greater degree, so that the force by which it is pushed against the opening edge of the groove is alleviated. Moreover, in the case when the distance from the greater chamfered portion to the bottom face of the groove is set to ½ or more of the thickness of the elastic member, the elastic member is received by the side face of the groove even when it is pressed onto either of the greater and smaller chamfered portions, and its shift in the axis direction is prevented.

In accordance with the roller bearing of the present invention, upon being fitted to the housing, the smaller chamfered portion is placed on the side closer to the housing. Consequently, although it receives a force from the housing in a direction reversed to the fitting direction, the elastic member is allowed to deform at the chamfered portion so that the force by which it is pushed against the edge of the opening of the groove is alleviated; thus, it becomes possible to prevent the elastic member from being damaged. In the case when the distance from the greater chamfered portion to the bottom face of the groove is set to ½ or more of the thickness of the elastic member, the elastic member is received by the side face of the groove even when it is pressed onto either of the greater and smaller chamfered portions, and its shift in the axis direction is prevented; therefore, it is possible to positively prevent the elastic member from coming off the groove.

In accordance with the motor device of the present invention, upon fitting the roller bearing to the housing, the greater chamfered portion is fitted thereto later. Although it receives a force from the housing in a direction reversed to the fitting direction, the elastic member is allowed to deform at the chamfered portion so that the force by which it is pushed against the edge of the opening of the groove is alleviated; thus, it becomes possible to prevent the elastic member from damages, and consequently to reduce troubles in the assembling processes of the motor device to a great degree, as well as improving the assembling efficiency. In the case when the distance from the greater chamfered portion to the bottom face of the groove is set to ½ or more of the thickness of the elastic member, the elastic member is received by the side face of the groove even when it is pressed onto either of the greater and smaller chamfered portions, and its shift in the axis direction is prevented; therefore, it is possible to positively prevent the elastic member from coming off the groove, and consequently to further improve the assembling efficiency in the assembling processes of the motor device.

BEST MODE FOR CARRYING OUT THE INVENTION

Referring to Figures, the following description will discuss Embodiments of the present invention. In the following description, the terms, "right and left", refer to the right and left of each Figure.

Figure 1:
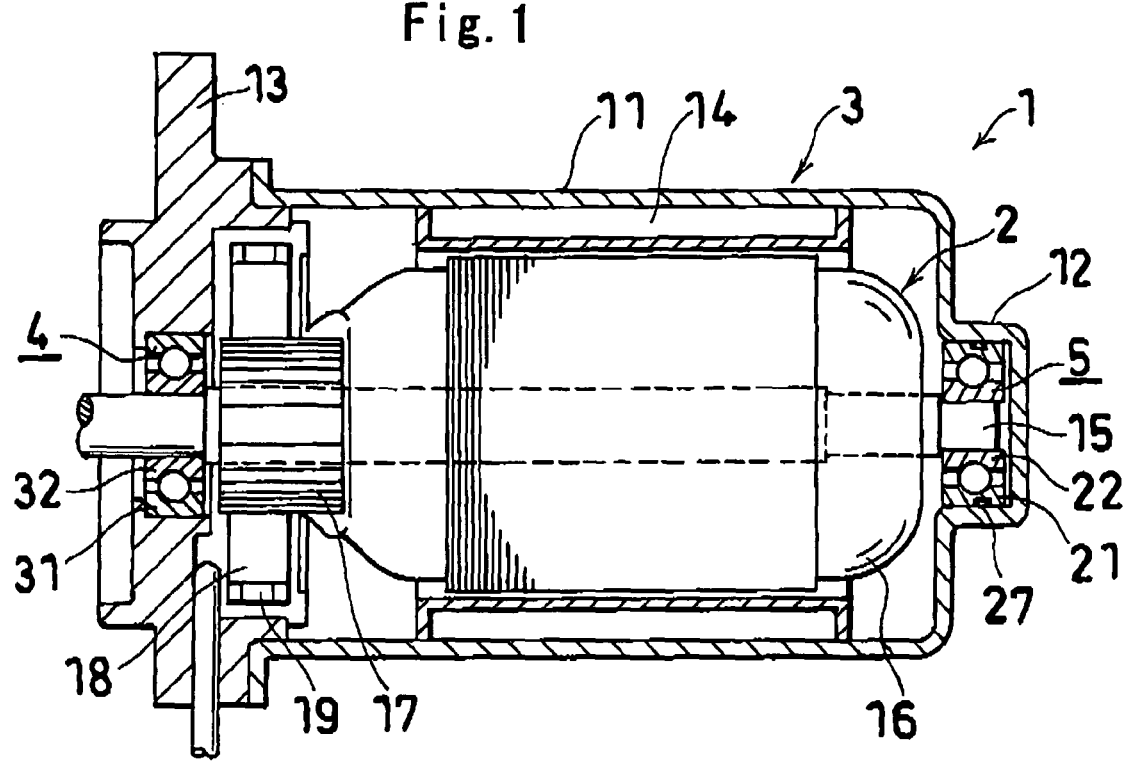
FIG. 1 is a vertical cross-sectional view that shows one Embodiment of a motor device in accordance with the present invention.
Figure 2:
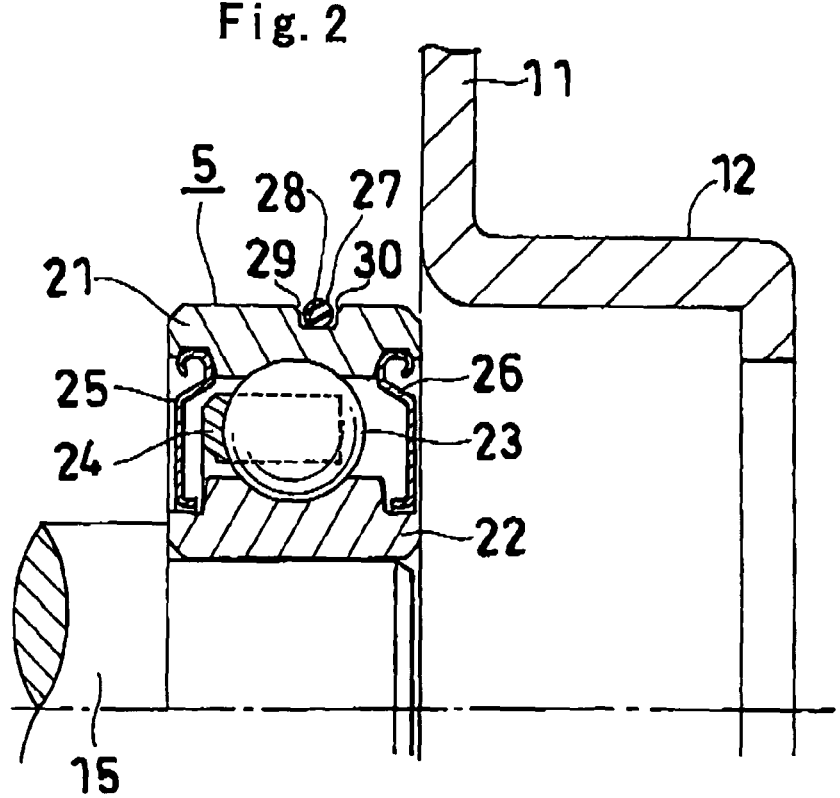
FIG. 2 is a vertical cross-sectional view that shows an upper half portion of one Embodiment of a roller bearing in accordance with the present invention.
Figure 3:
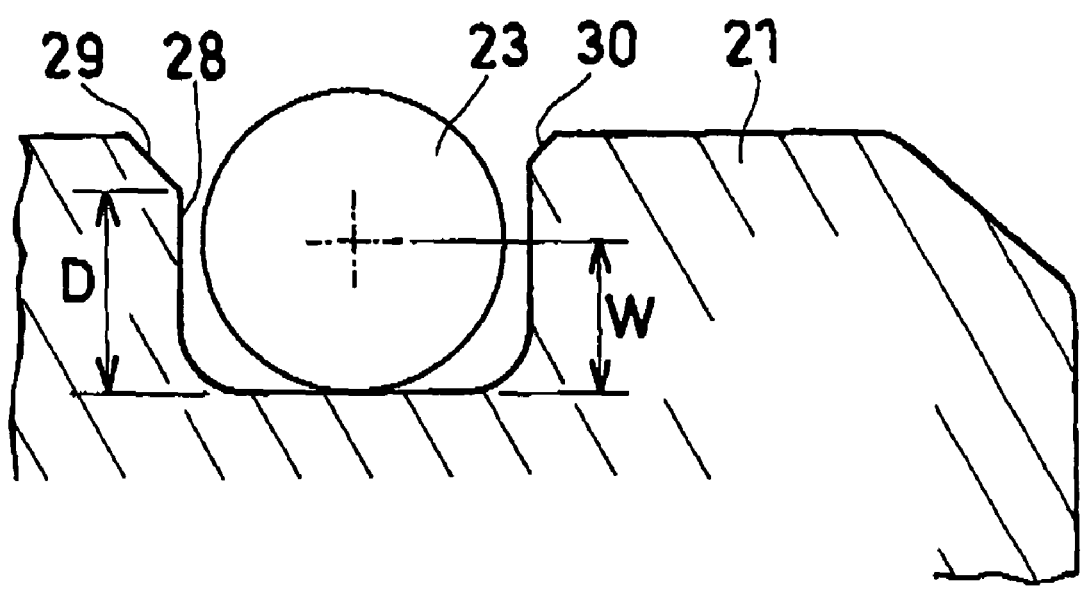
FIG. 3 is an enlarged vertical cross-sectional view that shows an essential portion of FIG. 2.

FIG. 1 shows a motor device in accordance with the present invention, FIG. 2 is an enlarged view that shows a roller bearing in accordance with the present invention, and FIG. 3 is a further enlarged view that shows an essential portion of the roller bearing.

A motor device (1), which is used for an electric power steering device, is provided with a motor (2), a housing (3) that houses the motor (2) and right and left roller bearings (4) and (5) that respectively support the right and left ends of a rotation axis (15) of the motor (2).

The housing (3) is provided with a yoke (11) that has a cylinder shape with a bottom and also has its left end opened, with a cylinder-shaped bearing supporting portion (12) having a small diameter being formed on its bottom, and an end plate (13) that covers the left-end opening of the yoke (11).

The motor (2) is constituted by a permanent magnet (14) that is placed on the inner circumferential face of the yoke (11), a rotation axis (15) that is freely rotatably placed in the housing (3), an armature (16) secured to the rotation axis (15), a commutator (17) that is secured at the left end of the rotation axis (15) and a brush (18) that is pressed by an elastic member (19) to be made in contact with the surface of the commutator (17).

Of the right and left roller bearings (4) and (5), the roller bearing (4) on the left side is a generally-used ball bearing having a structure in which an outer ring (31) is supported on the inner circumference of the end plate (13) with an inner ring (32) being secured to the rotation axis (15), and the roller bearing (5) on the right side, which is a roller bearing with an improved anti-creep property, has a structure in which an outer ring (21) to which an O-ring (27) is attached is supported by a bearing supporting portion (12) of the yoke (11), with an inner ring (22) being secured to the rotation axis (15). In accordance with the above-mentioned motor device (1), the yoke (11) is molded by a drawing press, and since the precision of the bearing supporting portion is inferior in comparison with that of the machining process, a gap tends to appear between the outer ring (21) of the roller bearing (5) on the right side and the bearing supporting portion (12), and in this case, a problem arises in which the two members are frequently made in contact with each other and separated from each other to cause vibrations and operation sound; therefore, the roller bearing (5) on the right side is prepared as a product having an improved anti-creep property.

As shown in FIG. 2, the roller bearing (5) on the right side is constituted by an outer ring (21), an inner ring (22), a plurality of balls (23) interposed between the two rings (21) and (22), a holder (24) that holds the balls (23), seals (25) and (26) that are placed on the right and left ends of the two rings (21) and (22), and an O-ring (27) serving as an elastic member that is fitted to an annular groove (28) that is formed on the outer circumference of the outer ring (21).

The hardness of the O-ring (27) is set in a range from Hs 60 to 75, and the amount of protrusion of the O-ring (27) from the groove (28) is set to 4 to 40% of the diameter of the O-ring (27).

As shown in FIG. 3, a chamfered portion (a large chamfered portion) (29), formed on the left side face of the groove (28), is greater than a chamfered portion (a small chamfered portion)(30) formed on the right side face thereof, with its distance D from the bottom face of the groove (28) being set to ½ (indicated by W in the Figure) or more of the wire diameter (thickness) of the O-ring (24).

Upon attaching the roller bearing (5) to the housing (2) of the motor device (1), as shown in FIG. 2, the large chamfered portion (29) is placed on the side farther from the bearing supporting portion (12), with the small chamfered portion (30) being placed on the side closer to the bearing supporting portion (12). At the time of this attaching operation, the O-ring (27) is subjected to a force in a leftward direction (a direction reversed to the fitting direction) from the bearing supporting portion (12); however, since the amount of the chamfer of the large chamfered portion (29) is greater, it is allowed to deform to a comparatively greater degree so that it become possible to prevent damages. Moreover, since $D \geqq W$ is satisfied, it is possible to prevent the O-ring (27) from coming off the groove (28).

Here, in place of the O-ring (27), another annular elastic member having various shapes may be adopted, and in this case, W (½ of the thickness) is found by (outer diameter of the elastic member−inner diameter of the elastic member)/4.

By setting the shape of a machining tool to a right-to-left asymmetric shape, the machining process of the groove (28) can be carried out by using a single cutting tool, and it becomes possible to avoid an increase in the number of processes in comparison with the groove that has right-to-left symmetric chamfered faces. Additionally, by carrying out an additional machining process, such as an R-machining process, on a groove having the right-to-left symmetric chamfered faces, a groove satisfying the above-mentioned conditions may be formed.

INDUSTRIAL APPLICABILITY

In accordance with a roller bearing and a motor device of the present invention, upon attaching the roller bearing to a housing, it is possible to prevent an elastic member from being damaged, and consequently to provide a motor device that can reduce problems with assembling processes to a great degree.

The invention claimed is:

1. A roller bearing comprising:
   an outer ring,
   an inner ring,
   a plurality of rollers placed between the two rings,
   an annular groove having side faces and formed in either one of the outer circumference of the outer ring and the inner circumference of the inner ring, and
   an O-ring having a generally circular section fitted to the annular groove,
   wherein a first chamfered portion is formed on one side face of the groove and a second chamfered portion is formed on the other side face of the groove, the first and second chamfered portions being asymmetric with each other,
   wherein one of the first and second chamfered portions is larger than the other of the first and second chamfered portions, the larger chamfered portion being spaced from the bottom face of the groove by a distance of ½ or more of the thickness of the O-ring.

2. A motor device comprising:
   a motor,
   a housing that accommodates the motor, and
   a roller bearing fittable in a supporting portion of the housing, the roller bearing having an outer ring, an inner ring and a plurality of rollers interposed between the two rings, and supports the rotation axis of the motor,
   wherein an O-ring having a generally circular section is fitted to an annular groove formed in the outer circumference of the outer ring of the roller bearing, the annular groove having side faces at opposite side in the direction of the rotation axis of the motor, wherein a first chamfered portion is formed on one side face of the groove, and a second chamfered portion is formed on the other side face of the groove, and wherein the first and second chamfered portions are asymmetric with each other,
   wherein one of the first and second chamfered portions is larger than the other of the first and second chamfered portions, the larger chamfered portion being spaced from the bottom face of the groove by a distance of ½ or more of the thickness of the O-ring.

3. The motor device according to claim 2, wherein the supporting portion of the housing has an open end for insertion of the roller bearing, and wherein the larger chamfered portion is provided at one of the side faces closer to the open end.

* * * * *